UNITED STATES PATENT OFFICE.

SAXTON C. SHOUP, OF FOSTORIA, OHIO.

PRESERVING COMPOUND.

SPECIFICATION forming part of Letters Patent No. 700,446, dated May 20, 1902.

Application filed February 26, 1902. Serial No. 95,657. (No specimens.)

*To all whom it may concern:*

Be it known that I, SAXTON C. SHOUP, a citizen of the United States, residing at Fostoria, in the county of Seneca and State of Ohio, have invented certain new and useful Improvements in Preserving Compounds; and I do hereby declare the following to be a full, clear, and exact description of the invention, such as will enable others skilled in the art to which it appertains to make and use the same.

My invention relates to preserving compounds.

The object of the invention is to form a compound by means of which fruit and other food may be preserved without fermentation or decomposition.

The compound consists of the following ingredients, preferably in the proportions stated: Flowers of sulfur, ten pounds; magnesia, two ounces; charcoal, (powdered,) one pound; New Orleans molasses, one pound; pulverized chalk, two ounces; and pulverized alum, four ounces. These ingredients are mixed together and molded in cakes.

The manner of application to the articles to be preserved is as follows: The fruit or other food-stuff is inclosed in an air-tight receptacle, into which is placed a sufficient quantity of the above-mentioned compound in fragments. Several jars of water are also placed in the receptacle, which is preferably a closet or box made as near air-tight as possible. The compound is then set on fire and the box closed, thereby retaining the gases produced by the combustion. These gases have the effect of preventing fermentation or decomposition of the fruit or other stuff within the box and preserve the same in its original freshness for an indefinite time. The products of combustion of the compound are not in any manner deleterious to the food, but, on the contrary, are considered to be healthful. Such of the fruit as may be desired for use may be taken from the box from time to time without neutralizing the effect of the preservative on the remainder. It is advisable, however, that the jars of water be kept filled.

Having thus described the invention, what I claim as new, and desire to secure by Letters Patent, is—

A preserving compound consisting of sulfur, magnesia, charcoal, molasses, chalk and alum, substantially as described.

In testimony whereof I affix my signature in presence of two witnesses.

SAXTON C. SHOUP.

Witnesses:
GEORGE P. SCHATZEL,
WILLIAM O. BULGER.